(12) United States Patent
Wärnbring et al.

(10) Patent No.: US 11,486,184 B2
(45) Date of Patent: Nov. 1, 2022

(54) PASSAGE GATE FOR EMERGENCY OPENING AND A CHECKOUT COUNTER

(71) Applicant: ITAB SHOP PRODUCTS AB, Jönköping (SE)

(72) Inventors: Peter Wärnbring, Bankeryd (SE); Mujo Redzovic, Huskvarna (SE)

(73) Assignee: ITAB SHOP PRODUCTS AB, Jönköping (SE)

( * ) Notice: Subject to any disclaimer, the term of this patent is extended or adjusted under 35 U.S.C. 154(b) by 543 days.

(21) Appl. No.: 16/478,067

(22) PCT Filed: Jan. 19, 2018

(86) PCT No.: PCT/SE2018/050043
§ 371 (c)(1),
(2) Date: Jul. 15, 2019

(87) PCT Pub. No.: WO2018/135997
PCT Pub. Date: Jul. 26, 2018

(65) Prior Publication Data
US 2019/0352953 A1  Nov. 21, 2019

(30) Foreign Application Priority Data

Jan. 19, 2017 (SE) ...................... 1750046

(51) Int. Cl.
*E05F 15/72* (2015.01)
*E05F 15/70* (2015.01)
(Continued)

(52) U.S. Cl.
CPC .............. *E05F 15/72* (2015.01); *E05F 15/70* (2015.01); *E06B 3/5072* (2013.01); *E06B 11/08* (2013.01);
(Continued)

(58) Field of Classification Search
CPC ............ E05Y 2900/10; E05Y 2400/852; E05Y 2900/40; E05Y 2400/85; E05Y 2400/45;
(Continued)

(56) References Cited

U.S. PATENT DOCUMENTS 4,619,074 A * 10/1986 Leung .................... E05D 15/58
49/165
4,792,018 A 12/1988 Humble et al.
(Continued)

FOREIGN PATENT DOCUMENTS

DE 202006004203 U1 7/2006
DE 102006050635 A1 4/2008
(Continued)

OTHER PUBLICATIONS

International Search Report and Written Opinion for PCT/SE2018/050043 dated Apr. 20, 2018.
(Continued)

*Primary Examiner* — Andrew Joseph Rudy
(74) *Attorney, Agent, or Firm* — Thompson Coburn LLP

(57) ABSTRACT

A passage gate for allowing or preventing people to enter or to exit a passage area comprising a base portion (110) and a panel portion (120) is provided. The passage gate (100) is configured to be driven in a first operation mode and a second operation mode. When the passage gate (100) is driven in the first operation mode the panel portion (120) is slidable relative the base portion (110) between a first open position, allowing people to pass, and a closed position preventing people from passing through the passage gate (100). When the passage gate (100) is driven in the second operation mode the base portion (110) is rotatable between the closed position and a second open position for achieving a larger passage area.

15 Claims, 3 Drawing Sheets

(51) Int. Cl.
*E06B 3/50* (2006.01)
*E06B 11/08* (2006.01)
*G06Q 20/20* (2012.01)
*G07G 1/00* (2006.01)

(52) U.S. Cl.
CPC ............ *G06Q 20/20* (2013.01); *G07G 1/0018* (2013.01); *E05Y 2400/45* (2013.01); *E05Y 2400/85* (2013.01); *E05Y 2400/852* (2013.01); *E05Y 2900/40* (2013.01)

(58) Field of Classification Search
CPC ........ G07G 1/0018; G07G 1/00; E05D 15/48; E05D 2015/485; E05D 15/485; E05F 15/638; E05F 15/70; E05F 15/72; E05F 15/611; E06B 11/085; E06B 3/5072; E06B 11/08; E06B 3/50; G06Q 20/20
USPC .......................................................... 705/16
See application file for complete search history.

(56) References Cited

U.S. PATENT DOCUMENTS

| | | | |
|---|---|---|---|
| 5,747,784 A | 5/1998 | Walter et al. | |
| 5,845,692 A | 12/1998 | Kellem et al. | |
| 5,974,737 A | 11/1999 | Barros et al. | |
| 6,481,160 B1* | 11/2002 | Kowalczyk | E05F 15/643 49/335 |
| 9,615,672 B2* | 4/2017 | Weisbeck | A47D 13/06 |
| 2007/0169899 A1* | 7/2007 | Cianciolo | E05D 15/58 160/211 |
| 2010/0242366 A1 | 9/2010 | Liebscher et al. | |

FOREIGN PATENT DOCUMENTS

| | | |
|---|---|---|
| DE | 102011077631 A1 | 12/2012 |
| EP | 2302151 A1 | 3/2011 |
| EP | 2458123 A1 | 5/2012 |
| EP | 2690247 A2 | 1/2014 |
| EP | 3015639 A1 | 5/2016 |

OTHER PUBLICATIONS

Swedish Search Report for Application No. 1750046-3 dated Sep. 12, 2017.
Extended European Search Report for European Patent Application No. 18741743.1 dated Nov. 11, 2020.

* cited by examiner

PASSAGE GATE FOR EMERGENCY OPENING AND A CHECKOUT COUNTER

CROSS-REFERENCE TO RELATED APPLICATIONS

This application is a national stage application of International Patent Application No. PCT/SE2018/050043, published as WO2018/135997, which was filed on Jan. 19, 2018, which claims priority to Swedish Patent Application No. 1750046-3, filed Jan. 19, 2017, the disclosures of which are incorporated by reference herein.

TECHNICAL FIELD

The present invention relates to an automatic passage gate. More particularly, the present invention relates to an automatic passage gate having an improved emergency functionality.

BACKGROUND

Shopping areas are preferably equipped with gates for allowing or preventing customers from entering or exiting the shopping areas at specific locations. For example, checkout counters may be equipped with exit gates which are held open while the checkout counter is attended and closed when no checkout assistant is present. Automatic gates are normally opened immediately once the checkout counter is activated, and kept in this position as long as the checkout counter is operating. However, when the assistant closes the checkout counter the gate will automatically return to a closed position thus blocking the exit and forcing customers to choose attended checkout counters. People will thus not be allowed to leave the shopping area through the closed exit but instead they are directed to another checkout counter, i.e. a supervised exit.

Another application for automatic passage gates is at automatic checkout counters by which the customer scans the objects to be purchased. The gate may thus be closed during the purchase, and opened only when the customer scans the receipt after payment. Consequently, the gate opens upon purchase verification and is returned to its closed position immediately after.

Automatic passage gates may also be arranged at shopping area entrances. Such gates are normally configured to open when a person is entering the shopping area, while it is held closed when a person is trying to exit the shopping area through the entrance. In this way, the customers are obliged to exit the shopping area through the checkout counters whereby fraud and theft is prohibited.

One well known passage gate is disclosed in EP2690247, made commercially available by the same applicant. EP2690247 discloses an automatic passage gate comprising a gate arm connected to a drum, a drive unit connected to said drum by means of a coupling having an input member and an output member stacked vertically, for causing a rotational movement of said drum. The drive unit and the coupling are arranged within said drum, and the output member of said coupling is secured to said drum.

Although well-functioning passage gates are available, there is a need for a gate that allows people to escape through the closed gate in case of emergency in a more efficient manner.

SUMMARY

Accordingly, the present invention preferably seeks to mitigate, alleviate or eliminate one or more of the above-identified deficiencies in the art and disadvantages singly or in any combination and solves at least the above-mentioned problems by providing an automatic passage gate according to the appended claims.

According to a first aspect, a passage gate for allowing or preventing people to enter or to exit a passage area is provided. The passage gate comprises a base portion and a panel portion. The passage gate is configured to be driven in a first operation mode and a second operation mode, wherein when the passage gate is driven in the first operation mode the panel portion is slidable relative the base portion between a first open position, allowing people to pass, and a closed position preventing people from passing through the passage gate, and wherein when the passage gate is driven in the second operation mode the base portion is rotatable between the closed position and a second open position for achieving a larger passage area. The larger passage area achieved in the second operation mode allows for a fast and secure evacuation from the passage area in an emergency. Having a sliding panel portion during first operation mode is beneficial since it is both space efficient and an effective way of preventing people from passing through the passage gate. Furthermore, a passage gate having a sliding panel portion is very ecstatically appealing.

The first operation mode may be used during normal operation and the second operation mode may be used during an emergency situation.

The base portion of the passage gate may be rotatable 180° around its axis.

In one embodiment, the base portion is connected to the underlying structure by means of a coupling. The coupling may be locked for maintaining a fixed position of the base portion, and unlocked for allowing rotation of the base portion.

The coupling may be configured to be unlocked upon an external force being applied to the panel portion. This may for example be the case when a person, during an emergency situation, applies force to the gate in order for it to open.

In one embodiment, the passage gate further comprises a controller configured to control the position of the panel portion relative the base portion. The controller may further be configured to control the coupling.

In one embodiment, the passage gate further comprises a first drive unit connected to the panel portion and configured to move the panel portion between the open and closed positions.

The passage gate may further comprise a second drive unit connected to the base portion and configured to rotate the base portion.

In a second aspect, a checkout system is provided. The checkout system comprises at least one passage gate according to the first aspect, a classification device by which articles are identified, a point-of-sale system for completing a transaction based on the articles identified by the classification device and a controller.

In one embodiment, when the passage gate is driven in the first operation mode, the controller receives information related to a successful payment of the article(s) from the point-of-sale system and in response thereto generate a signal for opening the passage gate.

The checkout counter may further comprise a sensor system. When the passage gate is driven in the first operation mode, the controller may receive information from the sensor system and in response thereto generate a signal for opening the passage gate.

BRIEF DESCRIPTION OF THE DRAWINGS

Embodiments of the invention will be described in the following; reference being made it the appended drawings which illustrate non-limiting examples of how the inventive concept can be reduced into practice.

DETAILED DESCRIPTION OF EMBODIMENTS

Figure 1A:
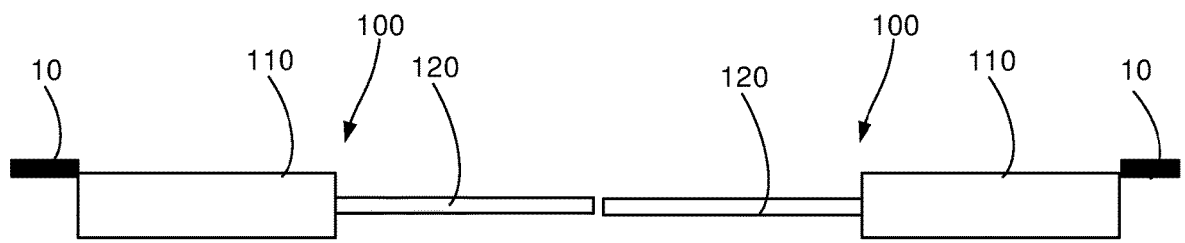
FIGS. 1a-c show a schematic top view of an automatic passage gate according to an embodiment of the present invention.
Figure 1B:
Figure 1C:
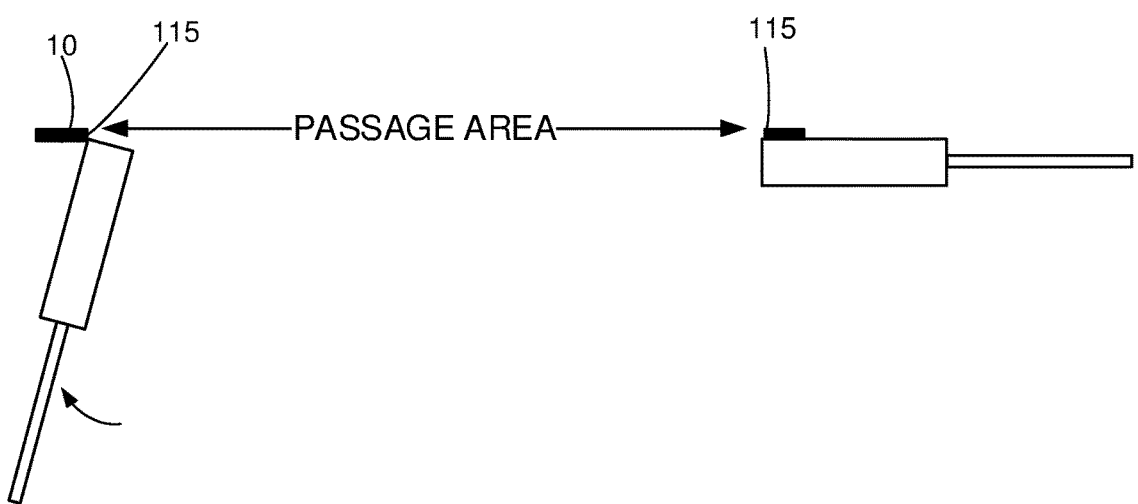

FIGS. 1a-c show an exemplified embodiment of an automatic passage gate 100. In the embodiment shown in FIG. 1a the passage gate 100 is in a closed position, thus preventing people to enter or exit a specific area. The area may be a shopping area, any kind of store, library, schools, ticket area in a train station or other areas where it is beneficial to allow or prevent people from entering and or exiting. The area may by fully or partly enclosed, for example with a fence-like-structure 10 as seen in FIGS. 1a-c.

FIG. 1a shows two automatic passage gates 100 in a closed state, waiting for a person to actively or passively initiate the activation process so as to open the gate. Once the customer has passed the gate, out of the store, the automatic passage gate 100 is moved back into its closed position. Each passage gate 100 comprises a base portion 110 and a panel portion 120. In a closed position the passage gate 100, and especially the panel portion 120, extends across the passage area in order to prevent people from entering and/or exiting.

The passage gate 100 is configured to be run in a first operation mode and in a second operation mode. The first operation mode may be used during normal operation, such as for example when the area to which the passage gate 100 is arranged needs to be controlled, for example during opening hours of a store. When the passage gate 100 is driven in the first operation mode, the passage gate 100 can be arranged in a first open position or a closed position.

The second operation mode may be used during special circumstances such as during an emergency and/or when the area such as a store is open or in situations where the area is restricted by other means (such as for example when a store is closed and the store personnel are cleaning the area) as soon will be described more in detail. When the passage gate 100 is driven in the second operation mode, the passage gate 100 can be arranged in a second open position or a closed position.

During normal operation, i.e. when the passage gate 100 is driven in a first operation mode, the passage gate 100 is opened automatically by sliding the panel portion 120 into the base portion 110, as seen in FIG. 1b. This is also referred to as the first open position. The base portion 110 is for this purpose e.g. including a recess in order to incorporate the panel portion 120 therein. Alternatively, the panel portion 120 may slide on one outer side of the base portion 110.

In the case of utilizing a recess in the base portion 110, the dimensions of the panel portion 120 are such that it can be fit into the recess of the base portion 110.

During normal operation, the passage gate 100 is very space efficient due to the sliding panel portion 120 which opens in a horizontal way. Sliding panels or gates are a very effective way of preventing people to pass and are easy to use since there is no need of pushing the panel or gate to open it.

The passage gate 100 may comprise a first drive unit configured to move the panel portion 120 between an open and closed position. The operation of the automatic passage gate 100 may e.g. be realized by an electrical motor being configured to drive the panel portion 120 relative the base portion 110. Such motorized sliding systems are well known.

The panel portion 120 may e.g. be constructed by different materials, such as glass, plastic, metal or the like. In some embodiments the panel portion 120 is in fact a solid panel extending from the floor and upwards to the upper end of the base portion 110. In other embodiments the height of the panel portion 120 is reduced, in particular by arranging the lower end of the panel portion 120 at a certain height above the floor. In other alternative embodiments the height of the panel portion 120 is higher than the base portion 110. The panel portion 120 may not necessarily include a solid panel but may instead by configured as one or more horizontal bars. As is evident, many different types of configurations for the panel portion 120 may be provided.

In an emergency situation, such as upon triggering of a fire alarm, many people will try to get out through the small exit area at the same time. Obviously, this is a very stressful situation and there is a risk of people getting hurt trying to fit a cramped exit area at the same time. Furthermore, there is a risk that electricity is shut off during the emergency or that the passage gate 100 for some other reason stops working while stuck in a closed position. The passage gate 100 disclosed herein is therefore configured with an emergency functionality. In case of emergency, the passage gate 100 may be opened in another way than in its normal operation, as illustrated in FIG. 1c. During special situations such as emergency, the passage gate will be driven in a second operation mode so as to open the passage gate in a second open position. As can be seen in FIG. 1c the base portion 110 is rotationally supported on the floor (or other underlying structure) such that the base portion 110 may be pivoted around a vertical axis. By such configuration the entire passage area greatly increases for allowing more people to pass through it. Preferably, the passage gate can be pivoted 180° around its axis. However, it should be noted that other pivoting angles may be possible. Depending on the dimensions of the passage gate 100, the passage area during an emergency exit may vary. In one embodiment the passage area is at least 2 meter wide.

In other words, in the first operation mode, the panel portion 120 is moveable relative the base portion 110 between a first open position, allowing people to pass, and a closed position preventing people from passing through the passage gate 100. In the first operation mode, the panel portion 120 is slidable relative the base portion 110 between the first open position and the closed position. In the second operation mode, the passage gate 100 is in a closed position when the panel portion 120 extends across the passage area in order to prevent people from entering and/or exiting. In the second operation mode, the (second) open position differ from that of the first operation mode (first open position). When the passage gate 100 is in the second operation mode, the second open position is achieved by that the base portion 110 is rotatable around its axis for achieving a larger passage area.

In one embodiment, when the passage gate 100 is driven in the second operation mode, the base portion 110 is rotated around its axis in order to achieve a larger passage area while the panel portion 120 is remained in its "closed" position where it extends out from the base portion 110.

In an alternative embodiment, when the passage gate 100 is driven in the second operation mode, the base portion 110 rotates around its axis in order to achieve a larger passage area and the panel portion 120 is slidably moved into a position where it does not extend out from the base portion 110 (i.e. in its "first open position"). Hence, in this embodiment the panel portion 120 is moved relative the base portion 110 between its open and closed position at the same time, or just before or after, as the base portion 110 rotates around its axis.

The rotational support may be envisaged in many different ways, as will be described more with reference to FIG. 2. For example, the base portion 110 may be connected to the underlying structure by means of a freewheel or other type of clutch, such that rotation in only one direction is allowed. If emergency exit is desired the base portion 120 should preferably be allowed to pivot outwards only. Moreover, the coupling 130 between the base portion 110 and the underlying structure may be locked during normal operation, whereby an alarm (indicating emergency) or an external force will unlock the coupling to allow for rotation of the base portion 110.

In a yet further embodiment the rotational movement of the base portion 110 may be motorized, whereby an alarm will not only unlock the coupling 130 but also drive the base portion 110 to its emergency position as indicated in FIG. 1c. This operation may be realized by having a second drive unit which is connected to the base portion 110 and configured to rotate the base portion 110.

The emergency opening functionality may be activated manually, automatically or in a combination of both. In one embodiment the emergency opening functionality is activated manually by an external force applied to the base portion 110 or the panel portion 120. The applied force, resulting from a person pushing on the gate, allows the passage gate 100 to rotate outwards so that a large passage area is achieved. In order to prevent misuse of this emergency opening, the passage gate 100 may have an alarm function that is activated when a person opens the gate using external force. The alarm function may be visual, audible or a combination of both. The alarm may for example comprise a speaker and/or a light indication.

In a further embodiment the emergency opening functionality is automatically activated once the passage gate 100 is set in an emergency mode. Once the passage gate 100 is set in an emergency mode, for example by the use of a controller 160 (see FIGS. 3a-c), the passage gate 100 is automatically opened by rotation of the passage gate 100, i.e. the base portion 110.

In yet another embodiment the emergency functionality is a combination of automatically and manually performed actions. First, the passage gate 100 is set in an emergency mode thus allowing rotation of the base portion 110. However, the passage gate 100 is only opened once an external force is applied to the gate 100.

The automatic passage gate 100 may be set in an emergency mode (second operation mode) in different ways, for example by personnel in the store pressing a dedicated emergency button or by a fire alarm being in communication with the controller 160.

The automatic passage gate 100 may further be in operable communication with a controller 160, configured to control the operation of closing and opening the passage gate 100. As will be discussed more in detail below, the controller 160 may further be configured to receive information related to a successful payment of one or a plurality of article(s), and to generate a signal to open the gate after receiving said payment information. The controller 160 is responsible for the overall operation of the opening and closing of the automatic passage gate 100 and is preferably implemented by any commercially available CPU ("Central Processing Unit"), DSP ("Digital Signal Processor") or any other electronic programmable logic device. The controller 160 may be configured to read instructions from a memory (not shown) and execute these instructions to control the operation of the passage gate 100. The memory may be implemented using any commonly known technology for computer-readable memories such as ROM, RAM, SRAM, DRAM, CMOS, FLASH, DDR, SDRAM or some other memory technology.

In one embodiment the controller 160 is arranged inside the passage gate 100. In a further embodiment the controller 160 is arranged in a greater system, being in operative communication with the passage gate 100.

In one embodiment, the automatic passage gate 100 may in its normal condition (not emergency) only be opened once it is activated by a signal from the controller 160. This signal may originate from a plurality of events and systems, depending on the specific area where the gate is used. In the example where the passage gate 100 is arranged in a store or shopping area, the activation of the passage gate 100 may be done automatically by a greater system or manually by a store attendant depending on the arrangement of the automatic passage gate in the area. However, the following description will focus on when activation of the automatic passage gate 100 is achieved by sensors arranged inside the passage gate 100 itself or through communication with a greater system, e.g. a point of sale (POS) terminal, a cash register and/or a sensor system.

Figure 2:
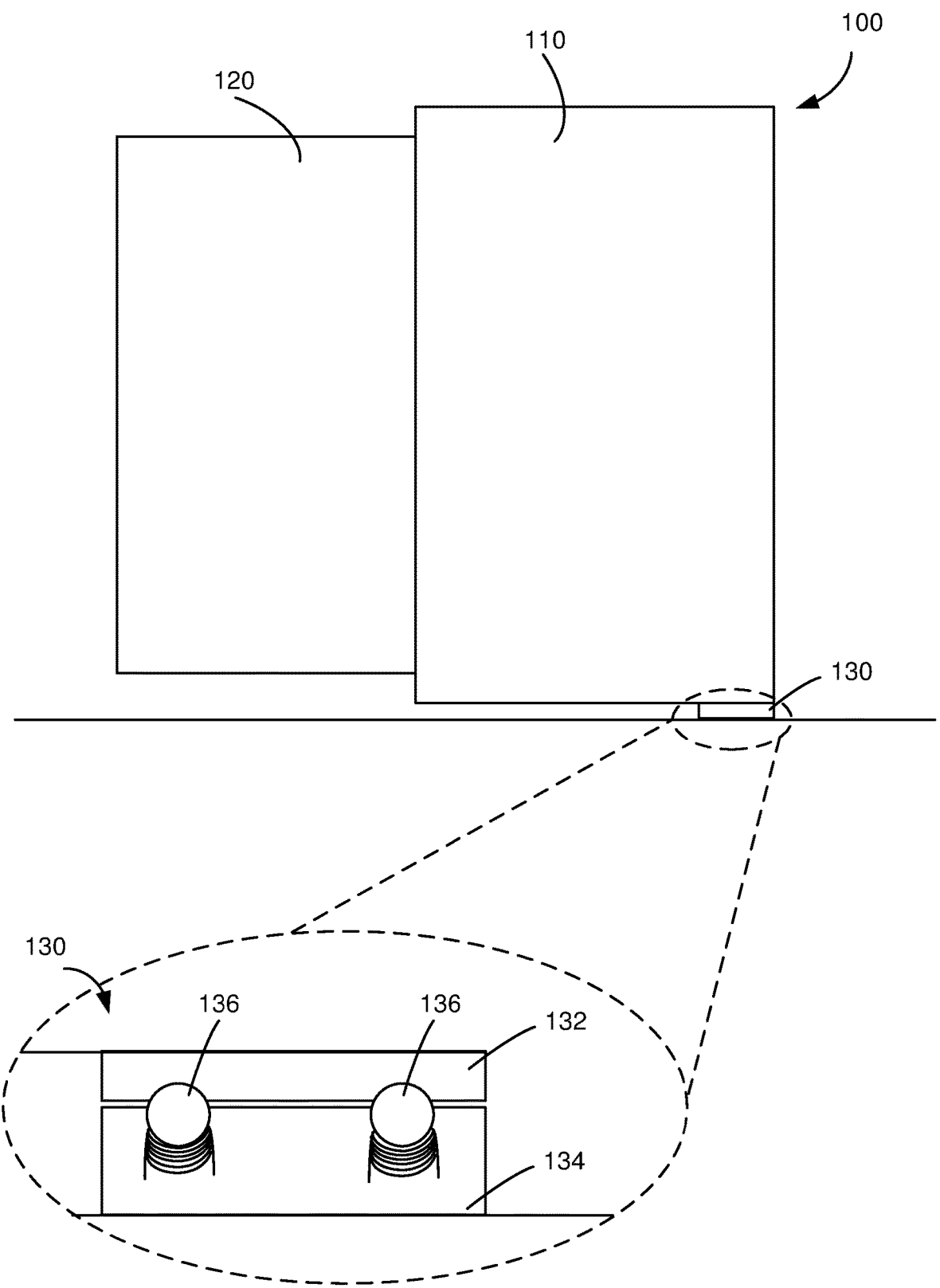
FIG. 2 shows a schematic view of a rotating means of an automatic passage gate according to an embodiment of the present invention.

FIG. 2 schematically shows how the passage gate 100 allows for the base portion 110 of gate 100 to pivot around a vertical axis by a rotation means 130. As previously mentioned, the rotation means 130 connects the base portion 110 to the underlying structure, such as the floor, and allows for rotation preferably in one direction only. The rotation means 130, according to the embodiment shown in FIG. 2, comprises a first portion 132 having one end fixedly connected to the base portion 110 of the gate 100 and a second portion 134 which connects the rotation means 130 to the underlying structure. The first portion 132 and the second portion 134 is provided with a plurality of circular recesses which are configured to accommodate spring loaded balls 136. When the first portion 132 and the second portion 134 are angularly aligned, the balls 136 ensure the desired position of the first portion 132 relative the second portion 134. In a locked state, i.e. in normal operating conditions, the spring loaded balls 136 prevents the base portion 110 of the gate to rotate. Once external force is applied to the gate 100, such as in an emergency situation, the springs are compressed as the first portion 132 is rotated relative the second portion 135, and the base portion 110 is thereby allowed to rotate gate is unlocked and allowed to rotate.

Figure 3A:
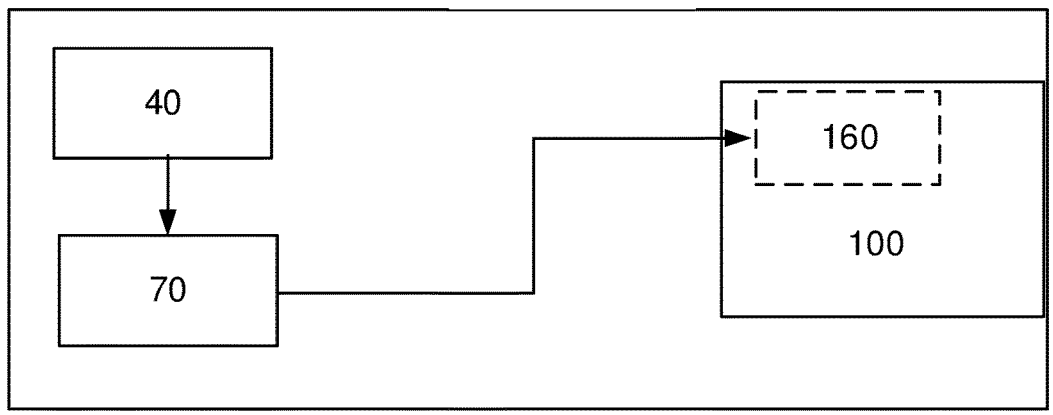
FIGS. 3a-c are schematic views of an automatic checkout system according to an embodiment of the present invention.
Figure 3B:
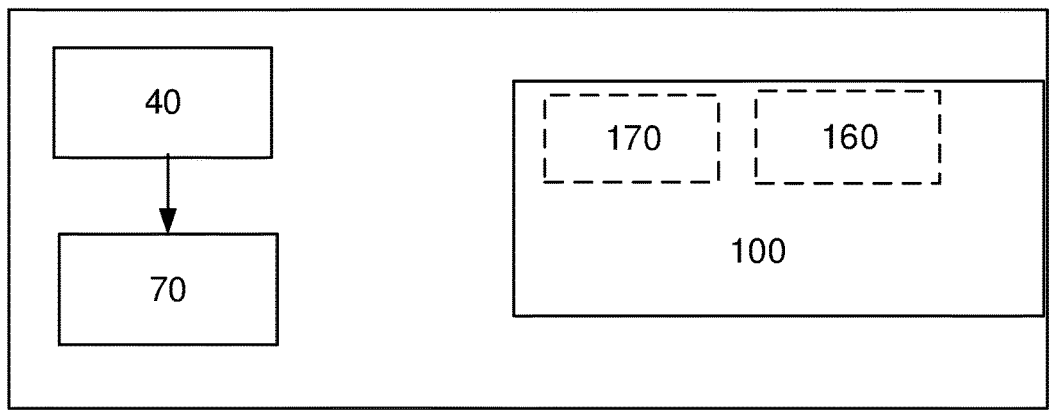
Figure 3C:
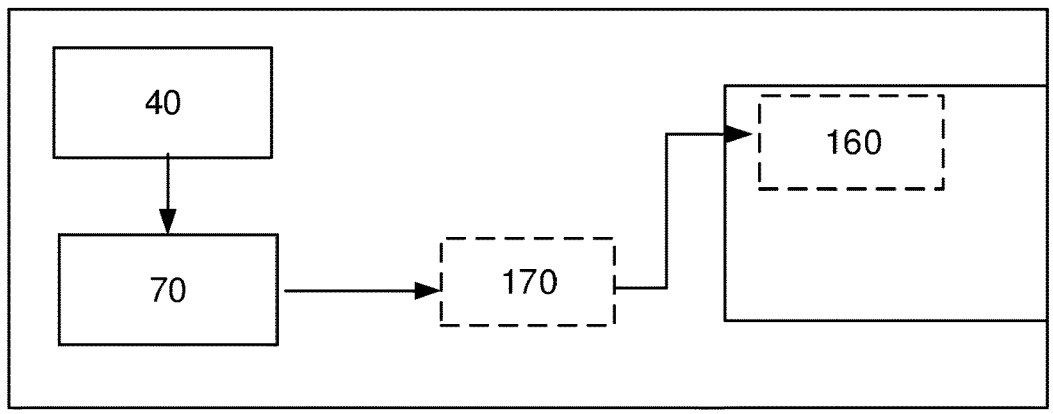

FIGS. 3a-c schematically show an automatic checkout counter comprising a classification device 40 (e.g. a bar code reader) by which the article are identified, a point-of-sale system 70 for completing a transaction based on the articles identified by the classification device 40 and a passage gate 100 configured to allow persons to exit the shopping area. As already mentioned, the automatic passage gate 100 may be controlled in various way, by using information relating to a payment transaction, by the customer scanning its receipt, by tracking the customer on its way from the point-of-sale system 70 towards the passage gate or by sensing that a customer is in close proximity of the passage gate 100. The different options will now be described.

In one embodiment, once all the articles of the customer are correctly identified by the classification device 40 a transaction signal is transmitted to the point-of-sale system 70 to allow the customer to finish the payment transaction. The point-of sale system 70 transmits a signal to the controller 160 in order to open the passage gate 100. The controller 160 is configured to control the operation of the passage gate 100. The controller 160 is further configured to receive information related to a successful payment of the article(s) and in response thereto generate the signal for opening, i.e. withdrawing of the panel portion 120 towards the base portion 110.

In some embodiment the system further comprises a sensor system 170 (see FIGS. 3b and c) configured to provide information to the controller 160 if the passage gate 100 should be opened or not. The sensor system 170 may be arranged inside the passage gate 100 or externally although being in communication with the passage gate 100.

In one embodiment the sensor system 170 comprises at least one verification sensor. The passage gate 100 is activated based on receiving information related to a successful verification of the identity of the person attempting to leave the store. Once the transaction is validly completed the person approaches the passage gate 100 and the passage gate 100 uses the verification sensor to verify that the person is in fact the person who finished the transaction. Once the sensor(s) 170 has verified the identity of the person the passage gate 100 is opened so that the person is allowed to exit. In one embodiment the verification is made by scanning the receipt which the customer received after a successful payment. In another embodiment the verification is made using cameras configured for facial recognition, where an image taken at the point-of-sale system is compared against an image taken by the verification sensor.

The passage gate 100 may also be allowed to open, in normal condition, based on a plurality of events. For example, the passage gate 100 may be opened once a customer approaches to the gate 100, as sensed by a sensor system 170, only if the "open" signal already has been transmitted from the POS-system 70. Hence, if a person approaches the gate 100 while the gate is not yet activated by the signal, the passage gate will remain closed.

The controller 160 may be configured with different safety functions. For example, the controller 160 may be configured to detect if more than one person leaves through the gate 100 at the same time and in response to that transmit an alarm signal. This may be the case where one person tries to avoid paying for his/hers article(s) and moves directly behind a paying customer. The alarm signal may be sent to a store clerk or other authorized personnel, to a mobile unit such as a tablet or a mobile phone arranged in the exit area displaying information, or as a visual or audible alarm arranged in conjunction to the exit.

Once the customer has passed through the passage gate 100, the passage gate 100 must be closed in order to prevent nonpaying customer to exit. The passage gate 100 may be closed after a predetermined time after the gate was opened, or by having sensors detecting the presence of a person. The automatic passage gate 100 may have several features in order to prevent potential misuse where persons are clamped between the gates. In one embodiment, the passage gate 100 is able to recognize if there is a person standing in the area of the passage gate 100, and thus not close the gate until the person has moved.

Although several embodiments has been described on how to activate the gate 100 through the use of a greater system it should be noted that the above activation methods could be combined into one single method.

The description above describes one example of a classification device. It should however be understood that other types of classification devices, operating on different technologies, could also be possible within the context of this specification.

It should be appreciated that even though numerous characteristics and advantages of the present invention have been set forth in the foregoing description, together with details of the structure and function of the invention, the description is only illustrative and changes may be made in detail, especially in matters of shape, size and arrangement of parts within the scope of the invention to the full extent indicated by the appended claims.

The invention claimed is:

1. A passage gate in a shopping area for allowing or preventing customers to enter or to exit a passage area, said passage gate comprising a base portion and a panel portion,
    wherein the passage gate is configured to be driven in a first operation mode and a second operation mode,
    wherein when the passage gate is driven in the first operation mode the panel portion is slidable relative the base portion between a first open position, allowing customers to pass, and a closed position preventing customers from passing through the passage gate, and
    wherein when the passage gate is driven in the second operation mode the base portion is rotatable between the closed position and a second open position for achieving a larger passage area.

2. The passage gate according to claim 1, wherein the base portion is rotatable around its axis.

3. The passage gate according to claim 1, wherein the first operation mode is used during normal operation and the second operation mode is used during an emergency situation.

4. The passage gate according to claim 3, wherein the passage gate is configured to be switched from normal operation to emergency operation by a user activating an emergency mode.

5. The passage gate according to claim 4, wherein the user activates the emergency mode by pressing a dedicated emergency button.

6. The passage gate according to claim 1, wherein the base portion is connected to the underlying structure by means of a coupling.

7. The passage gate according to claim 6, wherein the coupling is locked for maintaining a fixed position of the base portion, and unlocked for allowing rotation of the base portion.

8. The passage gate according to claim 7, wherein the coupling is configured to be unlocked upon an external force being applied to the panel portion.

9. The passage gate according to claim 1, further comprising a controller configured to control the position of the panel portion relative the base portion.

10. The passage gate according to claim 9, wherein the controller is further configured to control the coupling.

11. The passage gate according to claim 1, further comprising a first drive unit connected to the panel portion and configured to move the panel portion between the open and closed positions.

12. The passage gate according to claim 1, further comprising a second drive unit connected to the base portion and configured to rotate the base portion.

13. A checkout counter comprising at least one passage gate according to claim 1, a classification device by which articles are identified, a point-of-sale system for completing a transaction based on the articles identified by the classification device and a controller.

14. The checkout counter according to claim 13, wherein when the passage gate is driven in in the first operation mode, the controller receives information related to a successful payment of the article(s) from the point-of-sale system and in response thereto generate a signal for opening the passage gate.

15. The checkout counter according to claim 13, wherein the checkout counter further comprises a sensor system, and wherein the passage gate is driven in in the first operation mode the controller receives information from the sensor system and in response thereto generate a signal for opening the passage gate.

* * * * *